United States Patent
Zega

[11] 3,903,519
[45] Sept. 2, 1975

[54] ELECTRO-OPTICAL DEVICE FOR DISPLAYING A FAMILY OF SYMBOLS

[75] Inventor: Bogdan Zega, Geneve, Switzerland

[73] Assignee: Battelle Memorial Institute, Carouge, Switzerland

[22] Filed: Jan. 2, 1974

[21] Appl. No.: 429,910

[30] Foreign Application Priority Data

Jan. 3, 1973  Switzerland................ 4173/73

[52] U.S. Cl. ...... 340/378 R; 340/336; 350/160 LC
[51] Int. Cl.² .......................................... G08B 5/36
[58] Field of Search .......... 340/324 R, 336, 378 R; 350/160 LC

[56] References Cited
UNITED STATES PATENTS

| | | | |
|---|---|---|---|
| 3,622,224 | 11/1971 | Wysocki et al. | 350/160 LC |
| 3,731,986 | 5/1973 | Fergason | 340/324 R |
| 3,751,137 | 8/1973 | Fitzgibbons et al. | 340/336 |
| 3,760,403 | 9/1973 | Kippenhan | 340/336 |
| 3,781,863 | 12/1973 | Fujita | 340/336 |

Primary Examiner—David L. Trafton
Attorney, Agent, or Firm—Karl F. Ross; Herbert Dubno

[57] ABSTRACT

An electro-optical device for selectively displaying a set of alphanumerical characters has three or more closely juxtaposed carrier plates, all transparent or translucent with the possible exception of the last one, defining a plurality of cells filled with liquid crystals, each cell containing a pair of confronting electrodes supported on the major surfaces of its carrier plates. One electrode of each cell is subdivided into spaced-apart segments individually energizable to alter the light transmissivity of its liquid crystal, the patterns of these segments being different for the several cells and being so chosen as to synthesize any digit and/or alphabetic character upon selective energization thereof. The other cell electrode is a continuous counterelectrode so shaped as not to register with the energizing lead of any segment of the confronting patterned electrode.

9 Claims, 9 Drawing Figures

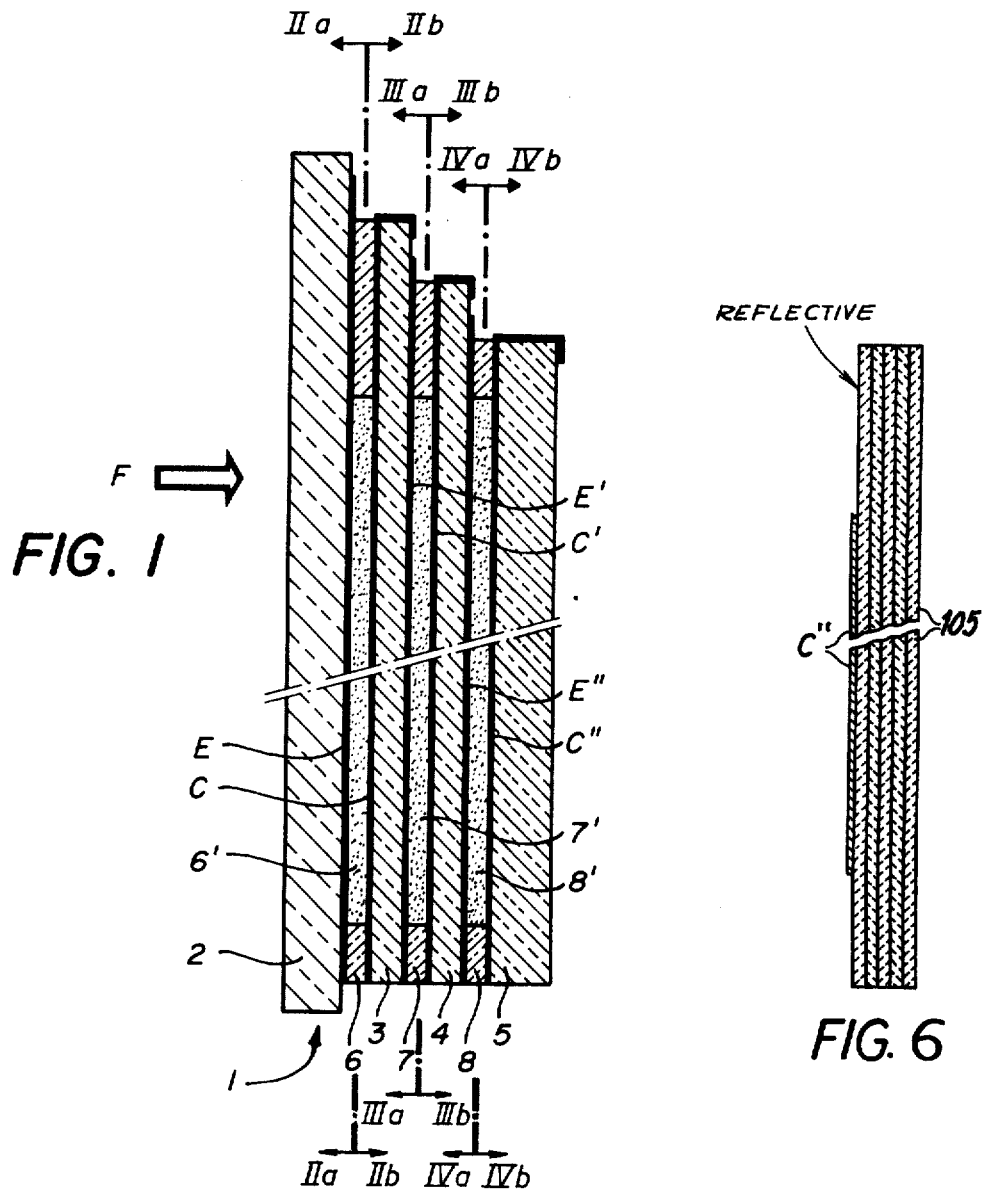

३,९०३,५१९

ELECTRO-OPTICAL DEVICE FOR DISPLAYING A FAMILY OF SYMBOLS

FIELD OF THE INVENTION

My present invention relates to a luminous display device of the type in which the variable light transmissivity of a confined liquid in an electro-optical cell, termed a liquid crystal, is utilized for temporarily generating a luminous pattern such as, for example, the outline of an alphanumerical character. Such devices, used for example in advertising or for public announcements, have the advantage of responding almost instantaneously to an applied control signal such as an alternating voltage.

BACKGROUND OF THE INVENTION

A nematic liquid of birefringent character in a narrow chamber with one or two light-transmissive (i.e. transparent or translucent) walls can be changed from a normal clear state to a nearly opaque or light-diffusing state by the application of voltage to a pair of electrodes within that chamber. At least one of these electrodes, shaped to produce the desired pattern, transmits incident light through the liquid crystal for reflection at the opposite electrode or penetration of the latter electrode to transluminate the cell. These electrodes are generally formed as metallic coatings on the confronting surfaces of a pair of closely spaced carrier plates constituting the major walls of the cell chamber which contains the liquid crystal.

The effect of the applied electric field upon the light transmissivity of a nematic liquid, which is in a phase intermediate the solid state and the isotropic liquid state of certain organic compositions, can be explained as follows: in its normal unexcited condition, the molecules of the liquid align themselves along the closely spaced chamber walls, either parallel or perpendicular to their major surfaces, which makes the fluid highly transparent. In the presence of an electric field, especially an alternating voltage, the molecules are ionized and become disoriented; their oscillations, coupled with the birefringence of the nematic liquid, give rise to an optical instability which clouds the liquid crystal and renders it more or less opaque. By limiting the applied field to a selected area of the cell, generally to one or more segments of one of its electrodes, light transluminating the cell or reflected from its rear wall can be selectively cut off to produce a desired pattern such as the outline of an alphanumerical character.

In the first of the two aforementioned instances, i.e. with a so-called homogeneous orientation in which the liquid crystal has an optical axis parallel to the electrode surfaces, a certain residual diffusion exists even in the absence of an electric field so that the contrast between the excited and the nonexcited state of the crystal is less marked than with the so-called homeotropic orientation in which the optical axis is perpendicular to the electrodes and therefore parallel to the direction of view. Among the various nematic liquids known in the art, a composition marketed by E. Merck Laboratories of Elmsford, N.Y. under the designation "Nematic Phase 5A" may be mentioned as one having this latter characteristic.

Other advantages of such passive electro-optical cells, aside from their rapid response, are their low rate of energy consumption and the fact that, unlike active emitters of luminous energy, the visibility of their display is unaffected by ambient lighting conditions. Moreover, they are inexpensive to produce and have a service life upwards of 3,000 hours, possibly attaining 10,000 hours with the known state of the art.

In order to be able to select any one of a family of symbols to be displayed, such as numerical digits and/or alphabetic characters, the segments of the pattern-forming electrode must be so arrayed that different combinations thereof will yield the desired outlines. Thus, it is known that the digits from 0 to 9 can be represented—albeit somewhat crudely—by a pattern of 7 segments; a minimum of 12 segments are required to synthesize the 26 capital letters of the Roman alphabet. It is also known to use orthogonal matrices with a minimum of 5×7 dot-shaped elements which can be energized by co-ordinate selection to reproduce any alphanumerical character.

In all these cases there can be only a rough approximation of the characters in question, sufficient for industrial purposes (e.g. for reading by a computer) but not entirely satisfactory in systems designed to convey information quickly and accurately to the general public, as in the case of illuminated signs on railroad stations, airports and highways. If greater precision is required, the number of segments must be increased; this, however, complicates the electrode structure since each segment must have its individual energizing lead which has to be insulated from all other segments on the face of the supporting carrier plate.

OBJECTS OF THE INVENTION

The general object of my present invention, therefore, is to provide means in such an electro-optical device enabling a substantial increase in the number of selectively energizable electrode segments without sacrificing an excessive amount of useful viewing area for the accommodation of supply leads.

A more particular object is to provide an electrode pattern which, while enabling virtually full utilization of a designated field of view, avoids the possibility of spurious dimming of any part of that field upon the energization of a supply lead.

SUMMARY OF THE INVENTION

A display device according to my invention comprises three or more carrier plates for a set of electrodes, i.e. two outer plates and at least one inner plate, defining between them a plurality of narrow cell chambers each filled with nematic liquid. The plates of each cell chamber have two parallel confronting surfaces provided with a pair of conductive coatings, one of these coatings constituting a patterned electrode divided into several spaced-apart and mutually insulated segments whereas the other coating is a counterelectrode registering with all these segments. All the inner plates and their coatings are light-transmissive, i.e. transparent or translucent; depending on whether the system is to operate episcopically or by translumination, one or both of the generally heavier outer plates and their coatings are also transmissive to incident light. Individual segments of the patterned electrode of each cell chamber are selectively energizable to alter the light transmissivity of the nematic liquid, the areas of simultaneously energizable segments of all the cell chambers complementing one another to permit optional synthesis of a multiplicity of symbols in a family of such symbols, e.g. the 10 numerical digits and/or the 26 letters of the alphabet.

The circuits required for the selective energization of the several electrode segments of each cell chamber include, in the case of an intricate pattern, leads extending to certain segments by passing through gaps between other segments of the same electrode. If these leads registered with parts of the associated counterelectrode, their energization would result in a dimming of the area covered by the leads so as to distort the resulting image of a selected alphanumerical character or other symbol. In accordance with another feature of my invention, therefore, I provide the associated counterelectrode with recesses which are aligned with the gaps traversed by leads of the patterned electrode. Since, generally, one or more of the other counterelectrodes in adjoining cell chambers will not be recessed at the locations of these gaps, their areas can still be utilized for selective illumination and dimming.

The display of alphanumerical characters generally requires a substantially rectangular display field, the segments of each patterned electrode being distributed within this field. Advantageously, pursuant to a further feature of my invention, one of the counterelectrodes (preferably the last one in the stack) is solid and has an outline corresponding to this display field, the associated patterned electrode then having a relatively simple structure enabling all its supply leads to terminate at the field boundary. Thus, for example, this latter electrode may have the shape of a letter X whose arms extend diagonally across the field; in a particularly desirable arrangement, designed to minimize the amount of overlap between segments of different cell chambers while affording the necessary diversity in illumination patterns, the segments of another electrode are in the shape of a figure 8 whereas those of a third electrode define a rectangular frame with a vertical center bar. The aforementioned rectangular counterelectrode, or its carrier plate, may be opaque and reflective for episcopic viewing; if both are transparent or translucent, they may be transluminated by a light source disposed behind that plate.

BRIEF DESCRIPTION OF THE DRAWING

The above and other features of my invention will be described in detail hereinafter with reference to the accompanying drawing in which:

FIG. 1 is a cross-sectional view of an electro-optical display device according to my invention;

FIG. 5 shows several alphanumerical characters adapted to be displayed with the device of FIG. 1; and FIG. 6 is a cross-sectional view of a modified rear plate in the device of FIG. 1.

SPECIFIC DESCRIPTION

Figure 2B:
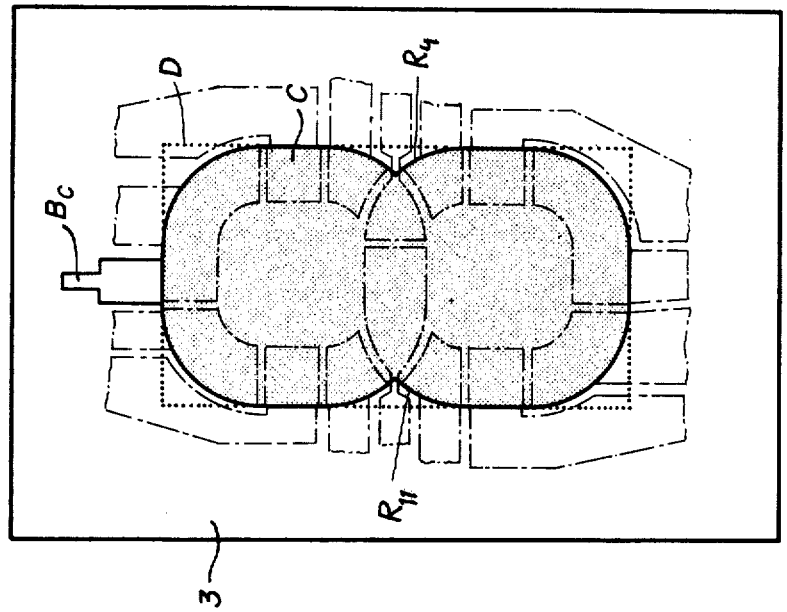
FIGS. 2a, 2b, 3a, 3b, 4a and 4b are sectional face views taken respectively on lines IIa—IIa, IIb—IIb, IIIa—IIIa, IIIb—IIIb, IVa—IVa and IVb—IVb of FIG. 1.

In FIG. 1 I have shown display device 1 with a stack of carrier plates of a transparent material, simply referred to hereinafter as glass, including a front plate 2, a first intermediate plate 3, a second intermediate plate 4 and a rear plate 5. The inner plates 3 and 4 are very thin, e.g. about 0.2 mm in thickness, while the outer plates 2 and 5 may be somewhat heavier for structural reasons. The plates are separated from one another by spacer frames 6, 7 and 8 whose thickness may be about 12$\mu$ and which define with these plates three cell chambers 6', 7' and 8' filled with a birefringent liquid, e.g. the aforementioned composition "Nematic Phase 5A" whose sharp contrast between excited and nonexcited areas makes it especially suitable for use in a system with several cascaded cell chambers.

The major walls of each cell chamber are defined by two closely juxtaposed parallel plate surfaces carrying a pair of electrodes in the form of thin metallic coatings, each electrode pair includes a patterned electrode E, E', E'' and an associated counterelectrode C, C', C''. With the possible exception of electrode C'', as discussed below, each of these electrodes is transparent to incident light traversing its carrier plate. They may consist, for example, of tin oxide formed by cathodic powder deposition from a diluted solution of tin tetrachloride, heated to a temperature of 550°C, on its vitreous substrate. In that case, the carrier plate advantageously consists of highly refractory borosilicate glass, e.g. as known under the mark Pyrex. Alternatively, the electrode may be an alloy of indium and tin deposited by cathodic vapor deposition in a rarefied atmosphere of argon and oxygen; in this instance the choice of glasses is much wider since no heating is required.

Figure 2A:
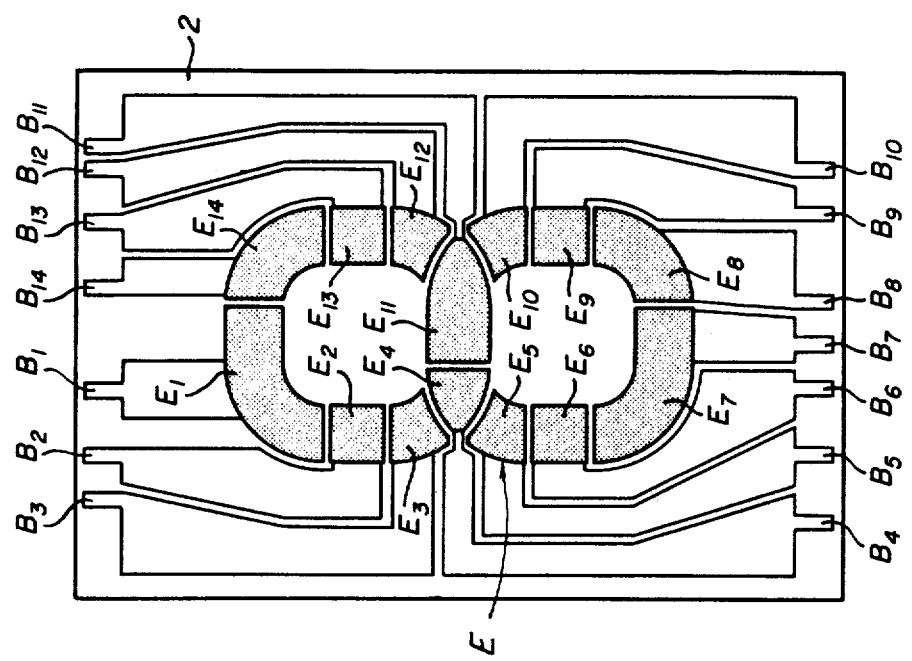
Figure 3B:
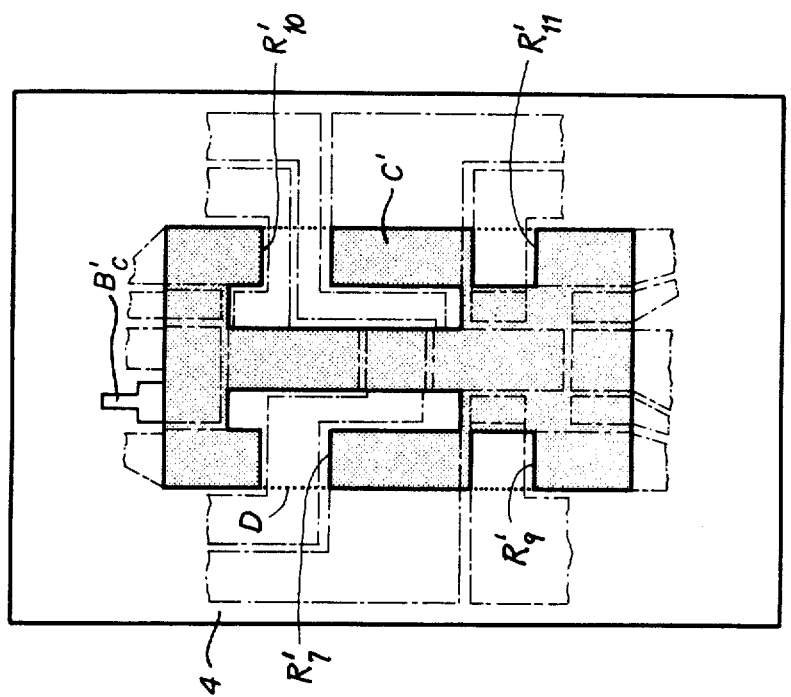
Figure 3A:
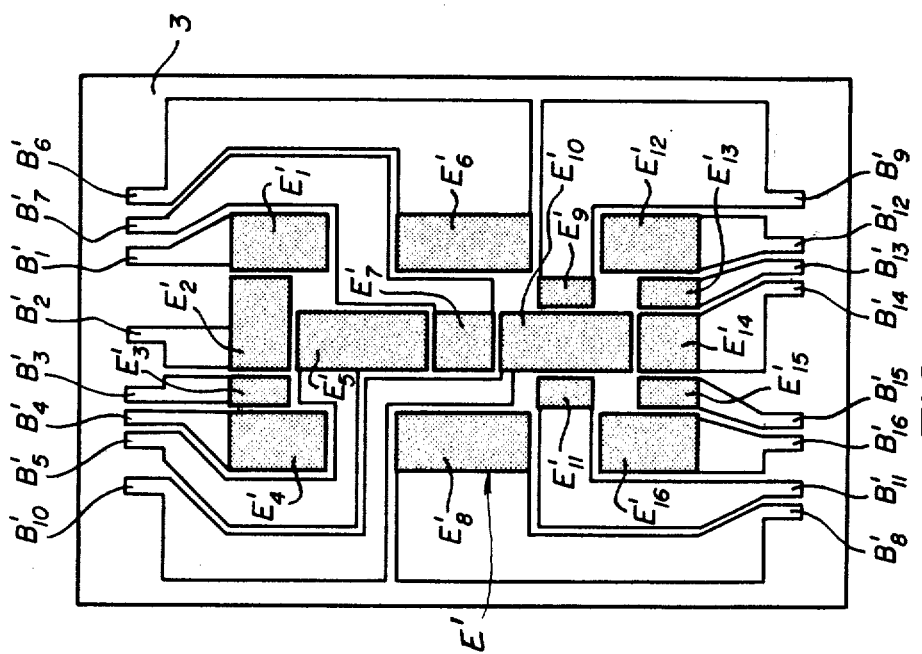
Figure 4B:
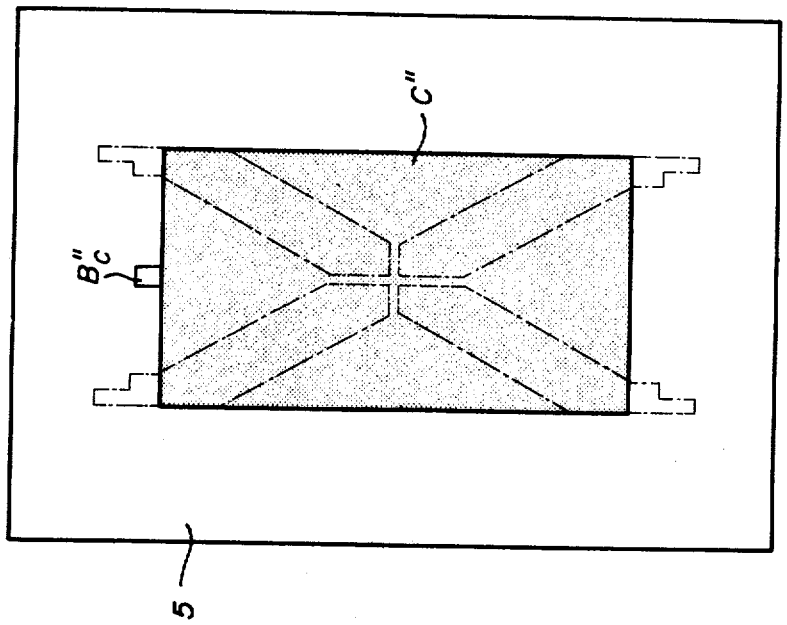
Figure 4A:
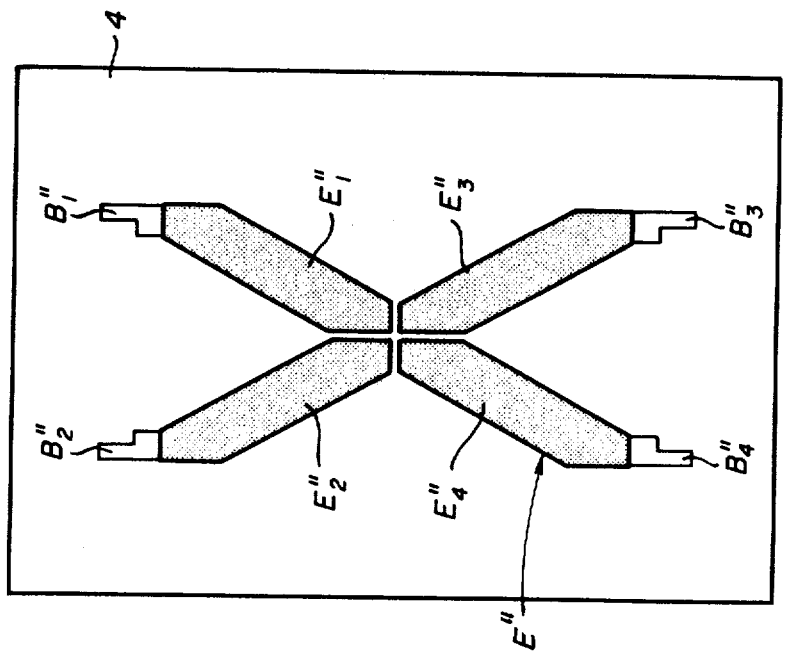

FIGS. 2a, 3a and 4a show the patterns of electrodes E, E' and E'', respectively, along with their supply leads which are formed concurrently therewith by the same process. FIGS. 2b, 3b and 4b illustrate the associated counterelectrodes C, C' and C'', respectively.

Electrode E, FIG. 2a, consists of 14 segments $E_1$–$E_{14}$ arrayed in a figure-eight pattern. The corresponding supply leads, with terminals near the edge of plate 2 for easy connection to an energizing circuit not further illustrated, have been designated $B_1$–$B_{14}$.

As shown in FIG. 2b, the associated counterelectrode C (shaded) on plate 3 has the same general outline as the patterned electrode E and fits within a rectangle D representing the display field. This Figure also indicates, in phantom lines, the areas of the segments $E_1$–$E_{14}$ (FIG. 2a) and of the associated supply leads $B_1$–$B_{14}$ in the vicinity of field D; it will be noted that none of these supply leads overlaps the electrode C. The supply lead for electrode C, designated $B_C$, is also offset from the leads of electrode E.

In an analogous manner, electrode E' carried on plate 3 has been subdivided into a multiplicity of segments $E'_1$–$E'_{16}$ with supply leads $B'_1$–$B'_{16}$, these segments defining a rectangular frame with a vertical center bar flanked by two additional segments ($E'_9$, $E'_{11}$) in the lower half of that frame. FIG. 3b, showing the forward face of plate 4, illustrates the associated counterelectrode C' which again is unitary and entirely confined within the rectangular display field D, its supply lead being designated $B'_C$. Again, the pattern of segments and leads from FIG. 3a has been partly superimposed upon the counterelectrode C' to show that none of the supply leads overlaps with any part of that counterelectrode within the field, or with its supply lead.

Thus, for example, the centrally positioned segment $E'_7$ has a supply lead $B'_7$ passing outwardly through a gap between two other segments $E'_1$ and $E'_6$. At a location registering with that gap, counterelectrode C' has a recess $R'_7$ overlying the lead $B'_7$ so as to prevent spurious dimming of that area upon energization of this lead. By the same token, recesses $R'_9$, $R'_{10}$ and $R'_{11}$ register with gaps accommodating the supply leads $B'_9$, $B'_{10}$ and $B'_{11}$ of segments $E'_9$, $E'_{10}$ and $E'_{11}$; recess R′₁₀ also overlies the lead B′₅ of segment E′₅, recesses R′₇, R′₉, R′₁₀, R′₁₁ and the gaps aligned therewith register with respective segments E₁₃, E₉, E₂, E₆ of electrode E.

Similar recesses can be discerned at R₁ and R₁₁ in FIG. 2b to accommodate leads B₁ and B₁₁ of FIG. 2a.

Electrode E″ on plate 4, as shown in FIG. 4a, is in the shape of an X with four segments E″₁–E″₄ extending diagonally of the display field A which coincides with the area of the rectangular counterelectrode C‴ illustrated in FIG. 5. The supply leads B″₁–B″₄ of electrode E″ all terminate at the boundary of the field so that electrode C″, whose own relatively offset supply lead is shown at B″₀, need not have any recesses.

If electrode C″ and its carrier plate 5 are transparent, an observer looking in the direction of arrow F (FIG. 1) will see a selected numeral or letter if a lamp or other light source is positioned behind this plate and if a corresponding combination of segments of electrodes E, E′ and/or E″ are energized through suitable switches not shown. Alternatively, the source of illumination could be behind the observer if electrode C″ is made reflective, e.g. in the form of an aluminum layer vacuum-deposited on its plate 5. In that case, however, illumination is strictly limited to the field D since any extension of the reflective electrode area beyond that field would give rise to shadows at the locations of leads B″₁–B″₄ upon energization of any of these leads. In order to enlarge the area of illumination beyond the actual display field, as for the purpose of placing a contrasting frame around the displayed character, it is therefore preferable to make the electrode support 5 opaque and reflective; electrode C″ could then be nonreflective and transparent, the same as all other electrodes of the device.

As illustrated in FIG. 6, a reflective electrode support of this nature may be a laminate 105 of a multiplicity of thin dielectric layers, e.g. of mica, causing reflection to occur at the first interface of the laminate. This is preferable to a disposition of a reflective layer on the rear face of transparent plate 5, FIG. 1, which would require the light rays to pass twice through the plate 5 with resulting absorption of luminous energy and a certain parallactic error. To minimize this parallactic error between adjoining cell chambers, the glasses at least of intermediate plates 3 and 4 are preferably of low refractive index (about 1.5).

It will be noted that electrodes E, E′, E″ alternate with electrodes C, C′, C″ so that all the patterned electrodes, on the one hand, and all their counterelectrodes, on the other hand, lie on corresponding sides (left and right, respectively) of their cell chambers. This arrangement is convenient for manufacturing purposes but, in view of the close spacing of all the electrodes in the stack, is not absolutely essential.

In FIG. 5 I have shown some typical alphanumerical patterns that can be displayed with the device according to my invention. Thus, letter K requires the energization of segments E₉, E₁₁ and E₁₃ of electrode E, E′₁, E′₆ and E′₁₂ of electrode E′, and E″₂, E″₄ of electrode E″. Letter S can be constituted from segments E₁, E₄–E₈ and E₁₁–E₁₄ of electrode E only. Letter Z is composed of segments E′₁–E′₄, E′₁₂–E′₁₆ of electrode E′ and E″₂, E″₄ of electrode E″. Numeral 5 requires energization of segments E₁–E₈, E₁₀, E₁₁ and E₁₃ of electrode E as well as E′₁–E′₄ and E′₆ of electrode E′. Numeral 2 can be represented by segments E₁–E₄, E₉–E₁₁, E₁₄ of electrode E and E′₁₂–E′₁₆ of electrode E′.

Thus, any letter or numeral can be easily synthesized from a suitable combination of energized segments, in a form closely representing that of corresponding typefaces except for the letter V which can only be approximated by the combination of segments E₂, E₁₃, E′₁, E′₄, E′₆, E′₈, E′₉, E′₁₁ and E′₁₄. If desired, supplemental segments enabling a more precise reproduction of this character can be added to one of the patterned electrodes E, E′, E″; it is also possible to use a fourth cell chamber with a V-shaped patterned electrode (which need not be subdivided) and a similar counterelectrode for this purpose. Although in theory the number of juxtaposed cell chambers could be increased at will, excessive light absorption and parallactic error make the use of a much larger number of chambers impractical. If only numerical symbols are required, two chambers will generally suffice.

Although optically in cascade, the several cell chamber 6′, 7′, 8′ of device 1 are electrically connected in parallel so that each chamber behaves as an individual narrow cell. Thus, the response time of the device (which is approximately proportional to the square of the electrode spacing) is the same as it would be with but a single chamber.

I claim:

1. An electro-optical display device comprising two outer plates and at least one inner plate closely juxtaposed and defining between them a plurality of narrow cell chambers each filled with a nematic liquid; the plates of each cell chamber having two parallel confronting surfaces provided with a pair of conductive coatings, the coating on one of said surfaces constituting a patterned electrode divided into several spaced-apart and mutually insulated segments, the coating on the other of said surfaces being a counterelectrode having a boundary which conforms to the outline of said patterned electrode and registering with all said segments thereof, at least one outer plate and each inner plate along with the coatings thereof being transmissive to incident light; and circuit means for selectively energizing individual segments of said patterned electrode of each cell chamber to alter the light transmissivity of said nematic liquid, the areas of simultaneously energizable segments of all said cell chambers complementing one another for optionally synthesizing a multiplicity of symbols in a family of such symbols, said circuit means including energizing leads for certain segments of a patterned electrode of one cell chamber passing through gaps between other segments thereof aligned with respective recesses of the associated counterelectrode, said gaps and recesses registering with respective segments of a patterned electrode of another of said cell chambers.

2. A display device as defined in claim 1 wherein said symbols are alphanumerical characters.

3. A display device as defined in claim 2 with two inner plates defining first, second and third cell chambers between said outer plates, the segments of each patterned electrode lying within a display field conforming to the outline of a substantially rectangular counterelectrode in said third cell chamber.

4. A display device as defined in claim 3 wherein said substantially rectangular counterelectrode is carried on the outer plate opposite said one outer plate.

5. A display device as defined in claim 4 wherein said substantially rectangular counterelectrode is opaque and reflective.

6. A display device as defined in claim 4 wherein said substantially rectangular counterelectrode is light-transmissive, said opposite outer plate being opaque and reflective.

7. A display device as defined in claim 6 wherein said opposite outer plate is a laminate of dielectric foils.

8. A display device as defined in claim 3 wherein the patterned electrode of said first cell chamber is of substantially figure-eight shape, the patterned electrode of said second cell chamber defines a substantially rectangular frame with a vertical center bar, and the patterned electrode of said third cell chamber is generally X-shaped with the arms of the X extending diagonally across the outline of said substantially rectangular counterelectrode.

9. A display device as defined in claim 1 wherein said patterned electrodes are disposed on corresponding sides of their respective cell chambers.

* * * * *